United States Patent [19]

Banwart et al.

[11] Patent Number: 4,754,467
[45] Date of Patent: Jun. 28, 1988

[54] DIGITAL SIGNAL DETECTION WITH SIGNAL BUFFERING AND MESSAGE INSERTION

[75] Inventors: Dean E. Banwart, Elgin; Michael W. Frenzer, Palatine; Thomas J. McClaughry, Schaumburg, all of Ill.

[73] Assignee: Motorola, Inc., Schaumburg, Ill.

[21] Appl. No.: 68,879

[22] Filed: Jul. 1, 1987

[51] Int. Cl.$^4$ .............................................. H04L 1/20
[52] U.S. Cl. .................................... 375/94; 371/65; 375/104; 455/304
[58] Field of Search ................. 358/314; 360/38.1; 371/31, 61, 62, 65; 375/5, 94, 99, 102, 104; 455/218, 222, 225, 296, 304, 309

[56] References Cited

U.S. PATENT DOCUMENTS

| | | | |
|---|---|---|---|
| 4,167,700 | 9/1979 | Coe et al. | 375/5 |
| 4,197,502 | 4/1980 | Sumner et al. | 375/75 |
| 4,203,134 | 5/1980 | Christopher et al. | 358/314 |
| 4,532,636 | 7/1985 | Wilkinson | 455/304 |
| 4,541,101 | 9/1985 | Potage et al. | 375/102 |
| 4,617,678 | 10/1986 | Devensky et al. | 375/102 |
| 4,660,201 | 4/1987 | Nakamura | 371/61 |

Primary Examiner—Benedict V. Safourek
Attorney, Agent, or Firm—Steven G. Parmelee

[57] ABSTRACT

An improved digital signal detector for indicating the presence of digital data used in a communication system. While attempting to detect valid data, the detector buffers an incoming signal in a first-in, first-out buffer and allows locally generated data, instead of the buffered signal, to be coupled to an output. After detecting valid data, the detector estimates where in the buffer valid data commenced and either releases data from that point or further delays the signal up to the maximum length of the buffer before releasing it to the output. The invention provides high sensitivity and rapid detection, reduces variation in detection time over previous methods, and allows locally generated data to be inserted into the signal path without loss of valid data.

The invention would find application in digital systems that require detection at high bit-error-rates without losing valid data and without relying on a particular message format to assist detection or in systems that locally insert preamble sequences for synchronization and control.

12 Claims, 1 Drawing Sheet

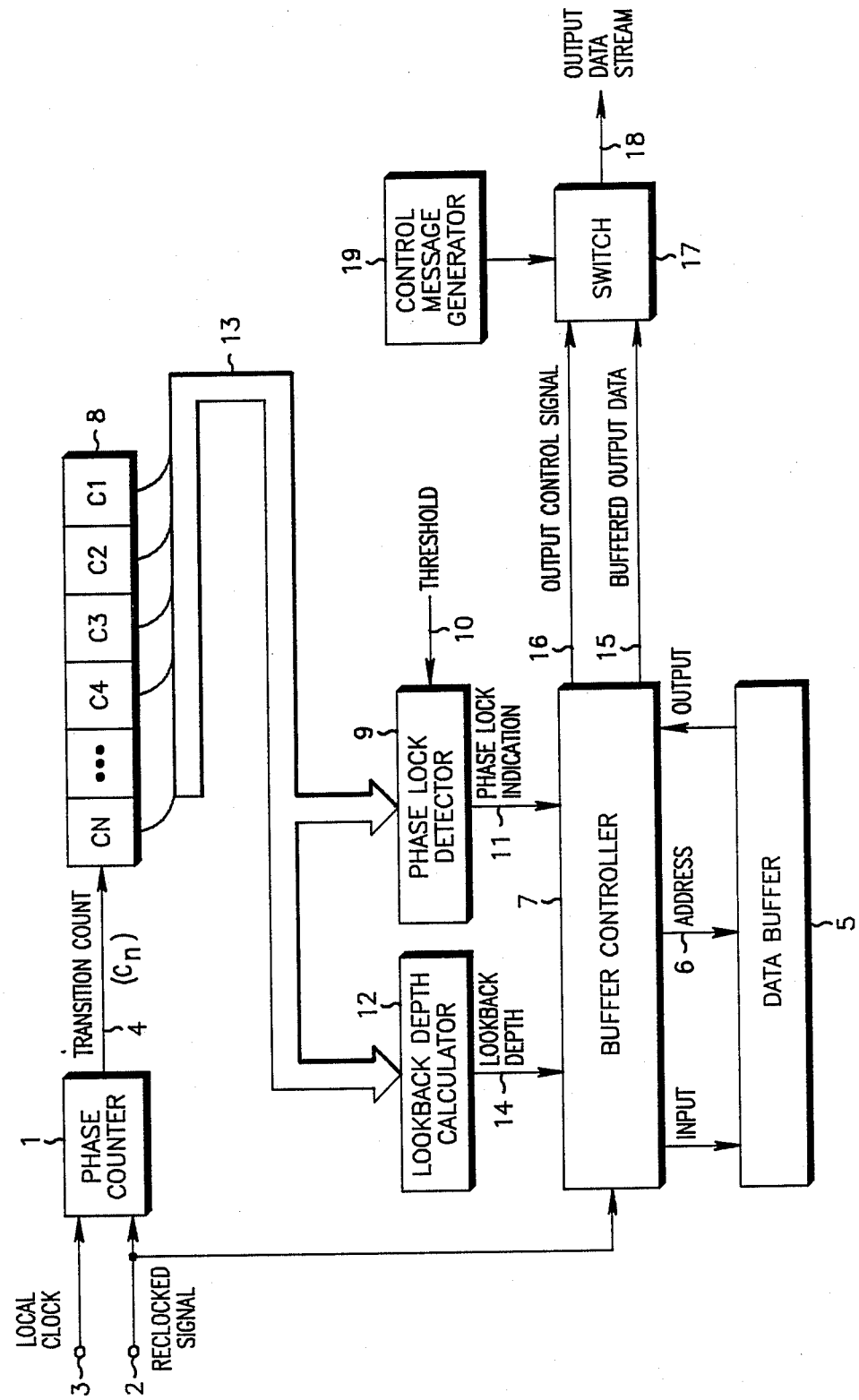

DIGITAL SIGNAL DETECTION WITH SIGNAL BUFFERING AND MESSAGE INSERTION

BACKGROUND OF THE INVENTION

1. Field of the Invention

This invention applies to digital communication systems and particularly to detecting the presence of digital data having known characteristics.

2. Description of the Prior Art

U.S. Pat. No. 4,167,700, "Digital Voice Protection System and Method," issued Sept. 11, 1979, to Coe et al., describes a radio communication system that carries voice messages, in either analog or digitally encoded format, and function control tones. The system includes base stations, mobile and portable radios, repeaters, and satellite receivers to provide wide geographic coverage. A feature of the system is automatic control of remotely located equipment, accomplished in part by digital signal detectors that examine the communication channel for the presence of digital data having known characteristics.

U.S. Pat. No. 4,197,502, "Digital Signal Detector," issued Apr. 8, 1980, to Sumner et al., describes a typical detector. The receiving equipment demodulates the waveforms from the channel and couples them to a limiter to create binary digital signals. A "phase lock" detector determines whether the binary signal is synchronous with a predetermined clock rate by attempting to phase lock a local clock to the limiter output. For a predefined time interval, a data transition counter accumulates a net count of transitions that occur close to the clock phase where data transitions are expected minus those that occur close to the opposite phase, where there definitely should be none. The count ignores transitions at other times, which would be produced by noisy or unreliable data.

On the average, the net count from random noise is zero, but there is finite probability to accumulate a count that results in "false detection." Similarly, hard-limited analog voice signals produce random transitions with finite probability of false detection. To prevent "falsing," the detector requires that the count exceed a threshold and uses hysteresis to decrease the threshold after the first detection to prevent intermittent detection. The threshold can also set a minimum frequency for control tones that will be detected. Below a certain frequency, too few transitions accumulate in the count interval, and the detector ignores the tones.

From a count above threshold, the equipment can infer that the received signal is digital data of use to it or a function control tone at a submultiple of the clock rate, both of which are considered "valid" data. Correlation between successive bits can be performed to distinguish between these two possibilities. Counts below threshold imply noise-like, random signals, which could be analog voice, idle channel noise, or data and tones at other clock rates, which are all considered "invalid" data.

Prior art digital signal detectors have several deficiencies. Detection times at high bit-error-rates are highly variable. If the detector fails to recognize valid data during one interval, it will require at least another full interval. Because high sensitivity requires long counting intervals, sensitive detectors burden throughput. Furthermore, the equipment ignores the incoming signal until it has decided that it constitutes valid data. In systems using preamble sequences to synchronize or activate local circuits, ignoring initial data shortens the effective preamble and degrades performance. Previous methods also leave an ambiguity in exact detection time equal to the length of the count interval and require truncating the signal by the full length of the count interval to insert control information into the signal path.

SUMMARY OF THE INVENTION

The invention is an improved method and apparatus for digital signal detection that determines whether an incoming digital signal constitutes valid data and that controls the flow of signal to an output. According to the invention, a transition counter measures the relative degree of phase lock between the incoming digital signal and a local clock for successive count intervals while a buffer stores successive bits of the incoming signal for at least the duration of an integral number, N, of count intervals. By summing N successive counts, comparing to a detection threshold, and updating the sum after each count interval, a phase-lock detector rapidly determines whether the buffered signal constitutes valid data. After detecting data within the buffered signal, a "lookback depth" calculator invokes an algorithm that estimates more precisely the location in the buffer at which valid data began. According to the estimated location, a buffer controller controls the flow of signal to the output: upon detection of valid data, the controller may immediately couple buffered signal to the output starting from the estimated point of valid data, or, knowing the point at which valid data began, it may additionally delay the buffered signal up to the maximum length of the buffer before coupling it to the output. The first mode gives fastest throughput; the second mode provides constant delay for all signals. While waiting to couple the buffered signal to the output, the controller may insert locally generated control data.

Storing and summing the transition counts for N successive intervals provides highly sensitive detection without requiring long waiting times and permits estimating when valid data began. Buffering the signal during detection enables inserting control data without loss of valid data.

BRIEF DESCRIPTION OF THE DRAWING

The invention is best explained by reference to the single FIGURE, which shows a block diagram of a digital signal detector constructed according to the invention.

DESCRIPTION OF THE PREFERRED EMBODIMENT

The digital signal detector operates on a "reclocked" digital signal from a communication channel, which can be developed according to prior art methods by hard limiting to produce a binary signal which is sampled on a particular phase of a local clock to produce the reclocked signal. Now, according to the invention, the input couples to a "phase counter" (1), which examines the timing of transitions of the reclocked signal (2) with respect to the local clock (3) and develops a transition count (4) indicating the degree of phase lock between the reclocked signal and the local clock. The phase counter samples for a number of clock periods defining a count interval and accumulates a net count indicating whether the reclocked signal and local clock are phase locked. Transitions that occur within a short time interval about a particular edge of the local clock indicate correct phase and increment the count; transitions that occur near the opposite clock phase show incorrect phase and decrement the count; and transitions that occur elsewhere are treated as noisy data and ignored. After the count interval, the phase counter produces the transition count, which will be used to decide whether the portion of signal examined represents valid digital data of use to the system.

The digital signal detector stores an integral number, N, of past transition counts in a transition count table (8). As counts enter the table, a buffer controller (7) feeds the reclocked signal into a "first-in, first-out" (FIFO) data buffer (5) whose maximum length equals at least N count intervals. FIFO buffers may take various forms and be realized in hardware or software, for example as shift registers or circular queues. As each new bit enters, the FIFO can displace the oldest bit or a more recent bit, depending on the output port or address selected (6). In the preferred embodiment, the clock rate is 12 kHz, the count interval is 10 mSec and represents 120 bits of signal, the count table holds eight transition counts, and the FIFO buffer stores 80 mSec of signal.

As each new transition count $C_n$ develops, a phase-lock detector (9) sums the N counts and compares the total to a threshold (10). If the total equals or exceeds threshold, detector (9) produces a phase-lock indication (11), implying that the signal in the FIFO buffer contains valid data, and the digital signal detector proceeds to estimate the count interval during which data commenced.

A "lookback depth" calculator (12) examines the transition counts (13) according to an estimation algorithm. Different algorithms may be used; a preferred one is described here. Experiment has shown that at low bit-error-rates on the channel, the transition count increases sharply at the count interval during which valid data commences; whereas, for detection at high bit-error-rates, the transition counts vary little but still reach a sufficient total to cross threshold. Therefore, if the individual counts show the characteristic sharp increase, the lookback depth algorithm estimates that data began during the interval of sharp increase. (The precision in indicating the start of valid data is the length of one count interval.) In contrast, if the counts show little variation, so that the start of data is uncertain, the algorithm arbitrarily estimates the oldest count interval as the start, which avoids missing possibly valid data.

A data buffer controller (7) uses the phase lock indication (11) in conjunction with the lookback depth signal (14) from the lookback depth calculator to control the output of reclocked data. Before valid data has been detected, the buffer controller can prevent the buffered output data (15) from the FIFO from coupling to the output data stream (18) and can send an output control signal (16) to the output switch (17) to couple locally generated data from a message generator (19) to the output data stream. After valid data has been detected, the controller has a choice. It may address the FIFO at the point indicated by the lookback calculator, in which case the reclocked data will become available immediately upon detection and will experience the minimum delay through the system. Instead, it may continue to accept incoming data until the earliest valid data will have been delayed by the maximum time available for the particular length FIFO and then couple the data through the output switch to the output data stream, whereby the valid data will have been delayed by the full length of the FIFO. During the extra delay from detection until valid data has been held the maximum time, the controller may continue to couple the message generator to the output data stream.

The choice of operating mode will depend on the application for the digital signal detector. In a system requiring fast throughput, the first mode would allow valid data to be coupled to the output as soon as detected; control data could be inserted up to the time of data detection. At low and moderate error rates, the digital signal detector usually will indicate detection before all N transition counts show valid data; therefore, at the time of detection, part of the data buffer will contain valid data, and part will contain invalid data. For particular choices of FIFO length and count interval, detection time statistics may be compiled to estimate the worst-case detection time at a given bit-error-rate. Locally generated message length can be selected accordingly. In a system requiring uniform throughput delay, the second mode would allow delaying data by the fixed length of the FIFO before making it available to the output.

For high sensitivity in a noisy channel environment, the detector must accumulate many transition counts. This invention provides an improvement over the prior art by responding at the earliest count interval at which the summed phase lock count crosses threshold. Prior art digital signal detectors had to accumulate for the duration of a long "window" and allowed significant amounts of data to be lost while determining validity. If detection failed during a first window, a second window, with its associated data loss, was required. This invention provides not only for buffering incoming signal while examining it but for updating the total transition count after each count interval. Once the total count crosses threshold, detection can be estimated to within the precision of a single count interval, without the ambiguity formerly experienced.

Although the invention has been disclosed in connection with the particular embodiment described above, it is understood that the novelty lies in buffering the incoming signal and transition counts while a decision is made, in updating the sum of transition counts after each count interval, in estimating the beginning of valid data, and in inserting locally generated data without loss of valid data. The scope of the invention is claimed includes modifications and additional applications that will be apparent to those skilled in the art. In particular, it is noted that the various steps of digital signal detection, such as producing and summing transition counts, storing the incoming signal and transition counts, estimating the start of valid data, and locally generating control messages, may be performed either by software or by hardware means.

What is claimed is:

1. A method for detecting the presence of valid data within an incoming signal and for controlling the flow of the incoming signal to an output according to whether valid data is detected, comprising the steps of:
   buffering the incoming signal for at least the duration of a buffering time and producing a buffered signal;
   examining the incoming signal to determine whether it constitutes valid data within the buffering time and continuing to examine the incoming signal until it is determined that it constitutes valid data within the buffering time; after which producing an estimate of when during the buffering time the data became valid; and controlling the flow of the buffered signal to the output according to the estimate.

2. The method of claim 1 including the step of controlling the flow of locally generated signals to the output according to the estimate of when during the buffering time the data became valid.

3. A method for detecting the presence of valid digital data within an incoming digital signal and for controlling the flow of the incoming digital signal to an output according to whether valid digital data is detected, comprising the steps of:

producing transition counts that indicate the relative degree of phase lock between the incoming digital signal and a local clock for the bits during successive count intervals;

storing an integral number, N, of the most recent transition counts;

buffering successive bits of the incoming digital signal during at least N successive count intervals and producing a buffered digital signal;

for each successive transition count produced, comparing a sum of the N most recent transition counts to a threshold; and if the sum is at least equal to the threshold, then producing an estimate of the count interval during which data became valid; and controlling the flow of the buffered digital signal to the output according to the estimate.

4. The method of claim 3 in which the step of producing an estimate of the count interval during which data became valid comprises the steps of comparing the N most recent transition counts and estimating that if the transition counts have approximately equal magnitudes, then valid data began during the earliest of the N most recent count intervals, or that if the transition counts differ significantly, then valid data began during the count interval for which the transition count increased significantly from transition counts stored for earlier count intervals.

5. The method of claim 3 in which the step of controlling the flow of the buffered digital signal includes the steps of allowing locally generated data to be coupled to the output before detecting the presence of valid data and coupling the buffered digital signal to the output without significant additional delay after detecting the presence of valid data.

6. The method of claim 3 in which the step of controlling the flow of the buffered digital signal includes the steps of allowing locally generated data to be coupled to the output before coupling the buffered signal to the output and waiting additional time after detecting the presence of valid data before coupling the buffered digital signal to the output, the additional time being the delay available from the count interval during which it was estimated that valid data began until the buffered digital signal has been buffered for at least N successive count intervals.

7. A signal detector for detecting the presence of valid data within an incoming signal and for controlling the flow of the incoming signal to an output according to whether valid data is detected, comprising:

means for buffering the incoming signal for at least the duration of a buffering time and for producing a buffered signal;

means for examining the incoming signal to determine whether it constitutes valid data within the buffering time and continuing to examine the incoming signal until it is determined that it constitutes valid data within the buffering time;

means for producing an estimate, after it is determined that the incoming signal constitutes valid data within the buffering time, of when during the buffering time the data became valid; and means for controlling the flow of the buffered signal to the output according to the estimate.

8. The signal detector of claim 7 including means for controlling the flow of locally generated signals to the output according to the estimate of when during the buffering time the data became valid.

9. A digital signal detector for detecting the presence of valid digital data within an incoming digital signal and for controlling the flow of the incoming digital signal to an output according to whether valid digital data is detected, comprising:

means for producing transition counts that indicate the relative degree of phase lock between the incoming digital signal and a local clock for the bits during successive count intervals;

means for storing an integral number, N, of the most recent transition counts;

means for buffering successive bits of the incoming digital signal during N successive count intervals and for producing a buffered digital signal;

means for comparing a sum of the N most recent transition counts to a threshold, for each successive transition count produced;

means for producing an estimate of the count interval during which data became valid, if the sum is at least equal to the threshold; and means for controlling the flow of the buffered digital signal to the output according to the estimate.

10. A digital signal detector according to claim 9 in which the means for producing an estimate of the count interval during which data became valid comprises means for comparing the N most recent transition counts and means for estimating that if the transition counts have approximately equal magnitudes, then valid data began during the earliest of the N most recent count intervals, or that if the transition counts differ significantly, then valid data began during the count interval for which the transition count increased significantly from transition counts stored for earlier count intervals.

11. A digital signal detector according to claim 9 in which the means for controlling the flow of the buffered digital signal includes means for allowing locally generated data to be coupled to the output before detecting the presence of valid data and means for coupling the buffered digital signal to the output without significant additional delay after detecting the presence of valid data.

12. A digital signal detector according to claim 9 in which the means for controlling the flow of the buffered digital signal includes means for allowing locally generated data to be coupled to the output before coupling the buffered signal to the output and means for waiting additional time after detecting the presence of valid data before coupling the buffered digital signal to the output, the additional time being the delay available from the count interval during which it was estimated that valid data began until the buffered digital signal has been buffered for at least N successive count intervals.

* * * * *